United States Patent
Robertson et al.

(10) Patent No.: US 10,059,428 B2
(45) Date of Patent: Aug. 28, 2018

(54) INFLIGHT CONNECTION OF AIRCRAFT

(71) Applicant: Bell Helicopter Textron Inc., Fort Worth, TX (US)

(72) Inventors: Daniel Bryan Robertson, Fort Worth, TX (US); Kirk Landon Groninga, Fort Worth, TX (US); Frank Bradley Stamps, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 469 days.

(21) Appl. No.: 15/233,927

(22) Filed: Aug. 10, 2016

(65) Prior Publication Data

US 2018/0043984 A1   Feb. 15, 2018

(51) Int. Cl.
| | |
|---|---|
| *B64C 3/10* | (2006.01) |
| *B64C 39/02* | (2006.01) |
| *B64C 9/00* | (2006.01) |

(52) U.S. Cl.
CPC ............... *B64C 3/10* (2013.01); *B64C 9/00* (2013.01); *B64C 39/024* (2013.01); *B64C 2201/021* (2013.01); *B64C 2201/108* (2013.01); *B64C 2201/126* (2013.01)

(58) Field of Classification Search
CPC .......... B64C 3/10; B64C 9/00; B64C 39/024; B64C 2201/021; B64C 2201/108; B64C 2201/126
See application file for complete search history.

(56) References Cited

U.S. PATENT DOCUMENTS

| | | | | |
|---|---|---|---|---|
| 2,863,618 | A * | 12/1958 | Doyle | B64D 5/00 244/2 |
| 2,969,933 | A * | 1/1961 | Vogt | B64C 37/02 244/2 |
| 3,161,373 | A * | 12/1964 | Vogt | B64D 5/00 244/2 |
| 3,226,056 | A * | 12/1965 | Holland, Jr. | B64C 37/02 244/2 |
| 3,249,322 | A * | 5/1966 | Holland, Jr. | B64D 5/00 244/3 |
| 7,518,864 | B2 | 4/2009 | Kimura | |
| 7,641,144 | B2 | 1/2010 | Kummer et al. | |

(Continued)

*Primary Examiner* — Justin M Benedik
(74) *Attorney, Agent, or Firm* — Lawrence Youst PLLC

(57) ABSTRACT

An inflight connection system for aircraft having at least one wing with a wingtip includes, for each aircraft, a primary connector selectively extendable from the wingtip, an alignment connector selectively extendable from the wingtip and a male and female connector assembly disposed proximate the wingtip. The primary connectors extend a greater distance from the wingtips than the alignment connectors such that the primary connectors form a first connection between the aircraft when the aircraft are flying in a connection pattern. Thereafter, retraction of the primary connectors reduces wingtip separation of the aircraft such that the alignment connectors form a second connection between the aircraft establishing coarse alignment therebetween. Thereafter, retraction of the primary and alignment connectors further reduces wingtip separation of the aircraft such that the male and female connector assemblies form a third connection between the aircraft establishing fine alignment therebetween.

20 Claims, 11 Drawing Sheets

(56) References Cited

U.S. PATENT DOCUMENTS

| | | | | |
|---|---|---|---|---|
| 7,789,339 B2* | 9/2010 | Sommer | ............... | B64C 37/02 |
| | | | | 244/117 R |
| 8,061,646 B2* | 11/2011 | Gomez | ............... | B64C 37/02 |
| | | | | 244/2 |
| 8,727,265 B2 | 5/2014 | Altmikus et al. | | |
| 8,936,212 B1* | 1/2015 | Fu | ............... | B64C 3/56 |
| | | | | 244/12.4 |
| 9,409,643 B2 | 8/2016 | Mores et al. | | |
| 9,452,832 B2 | 9/2016 | Heid | | |

* cited by examiner

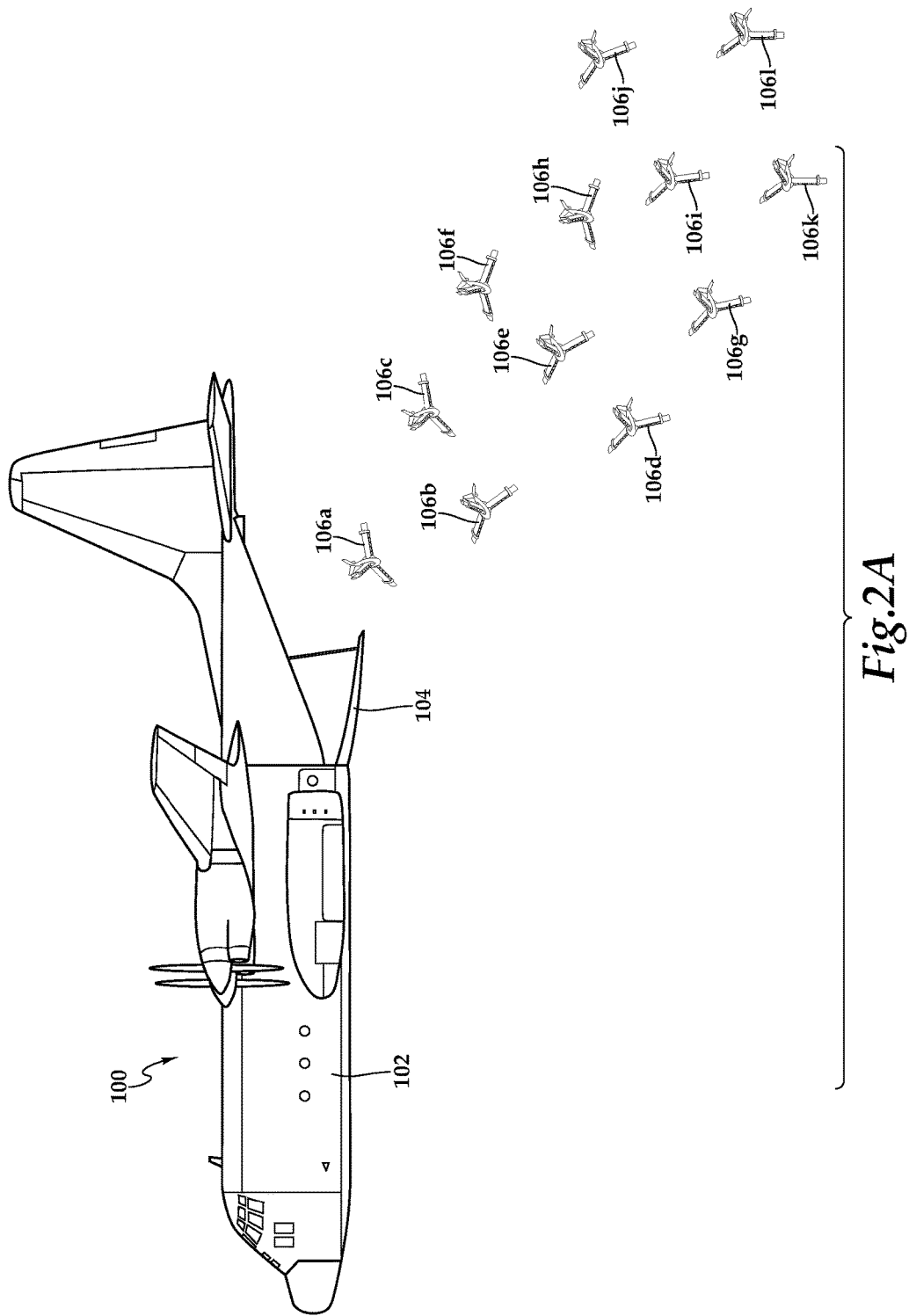

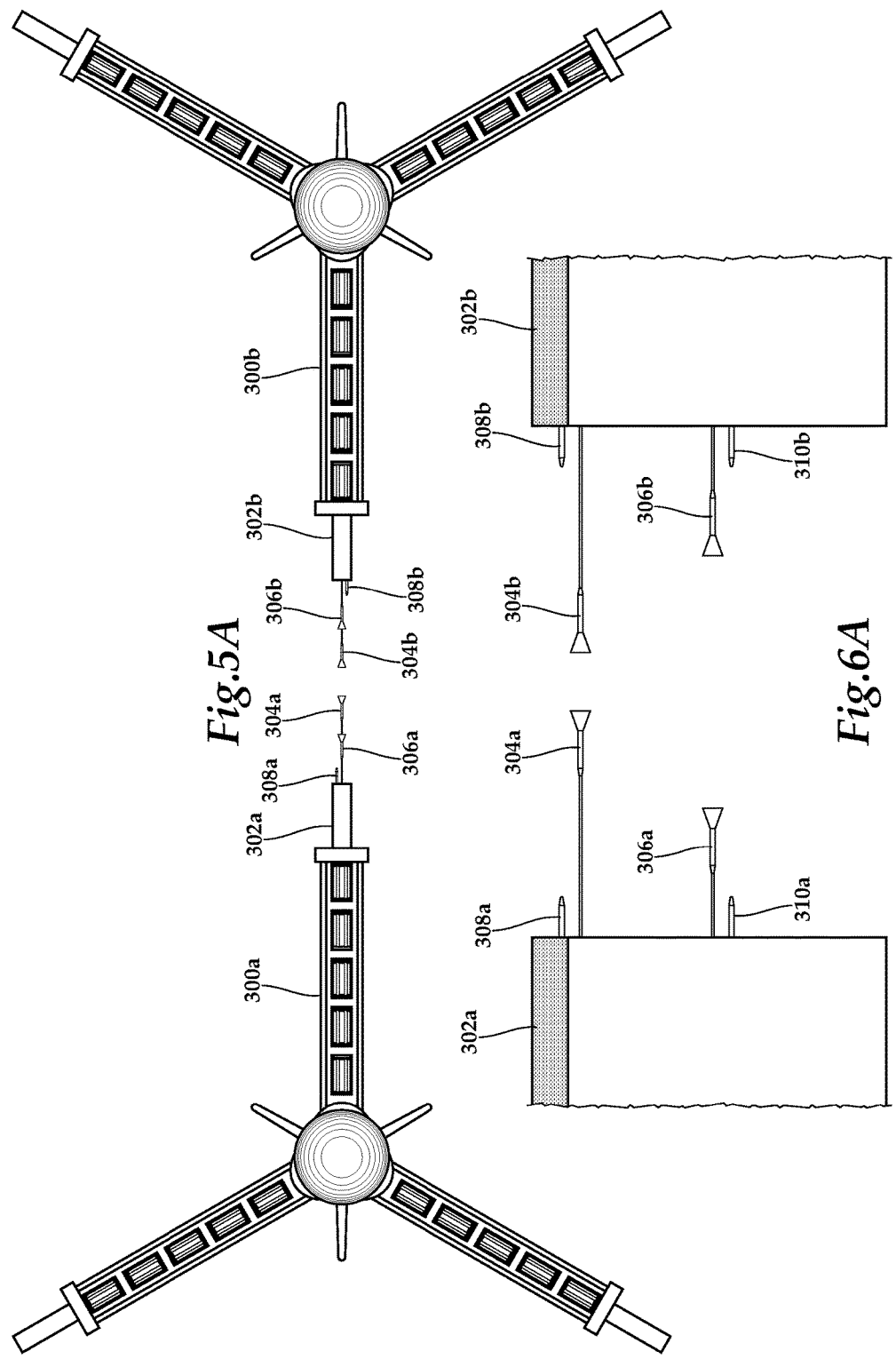

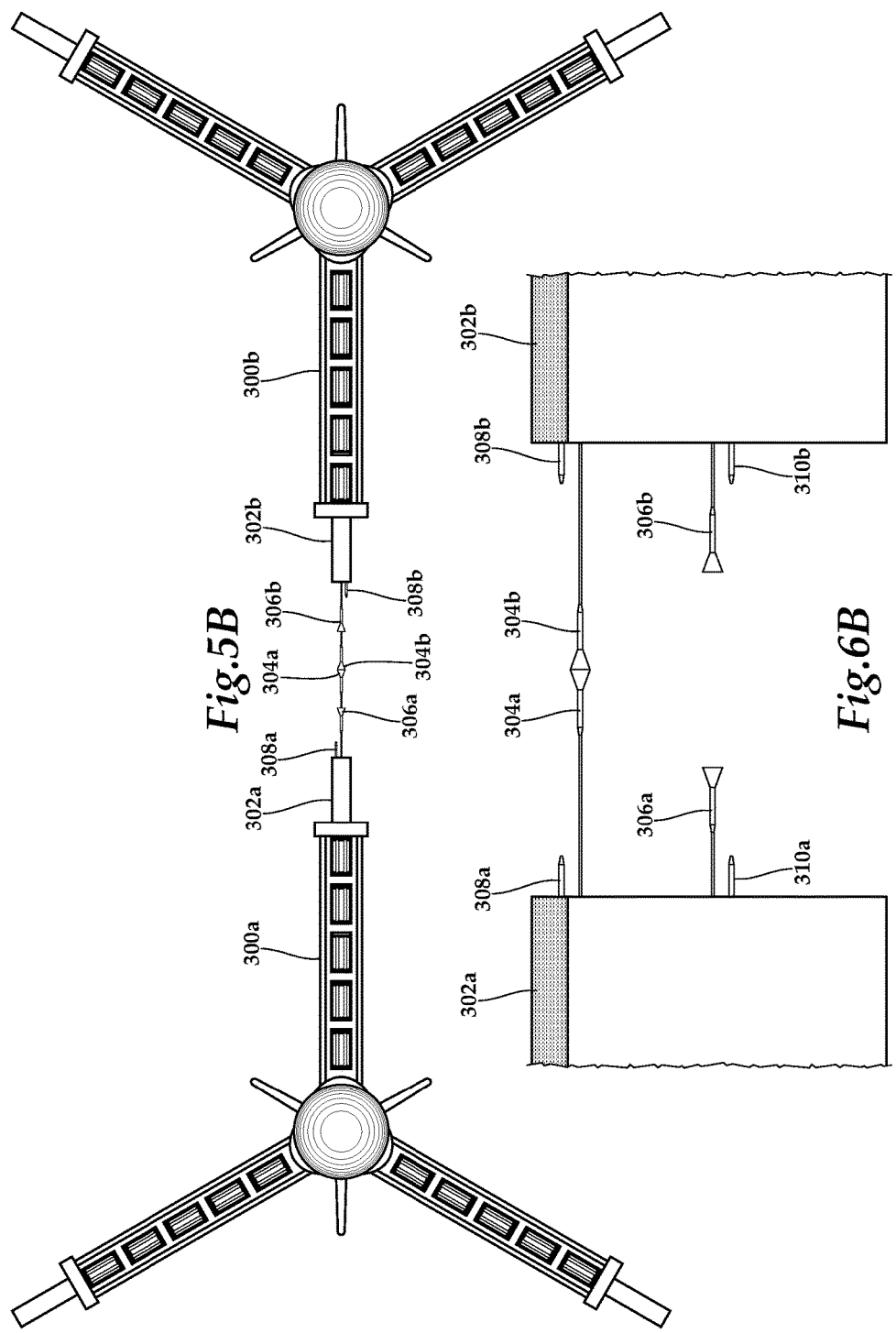

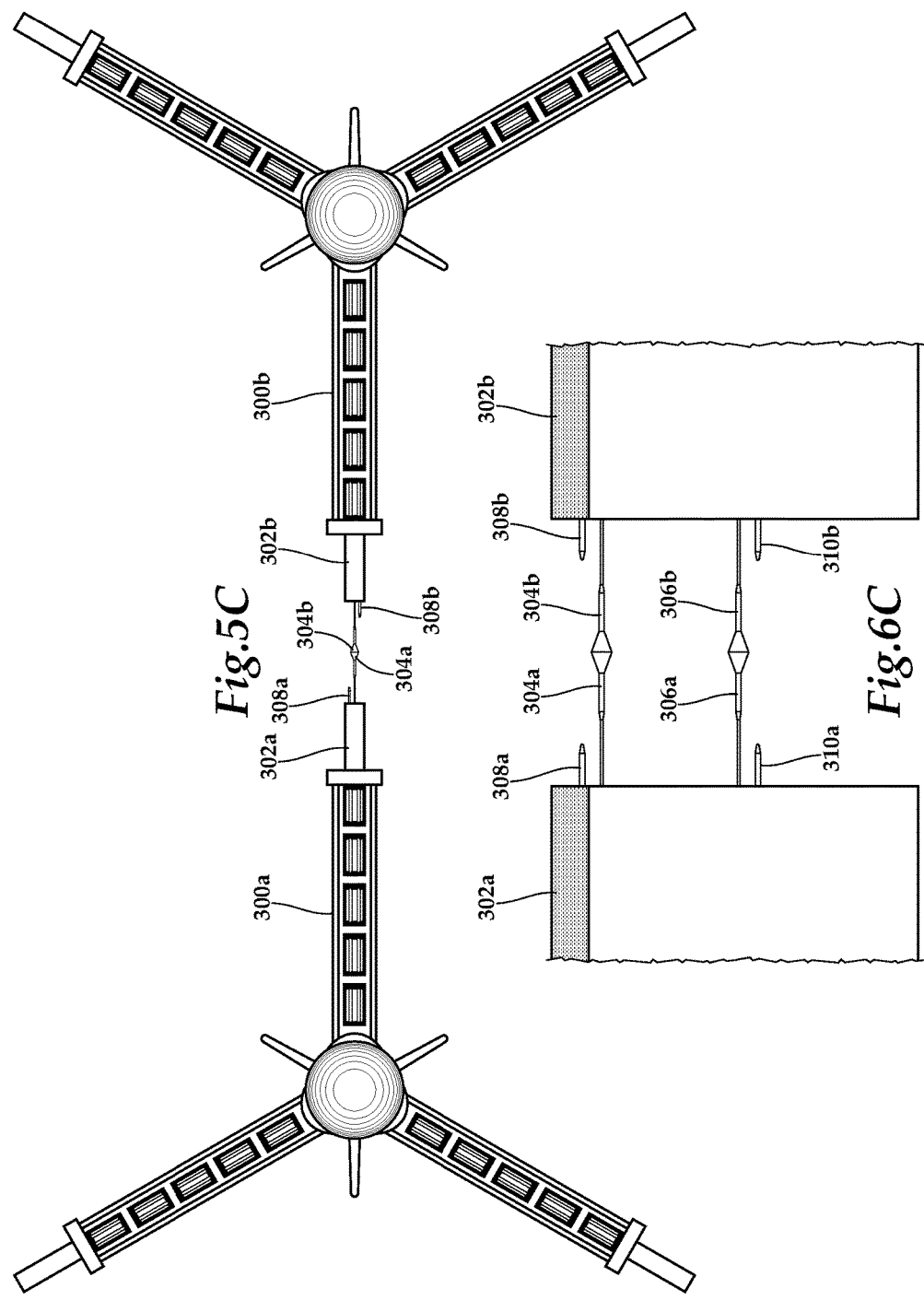

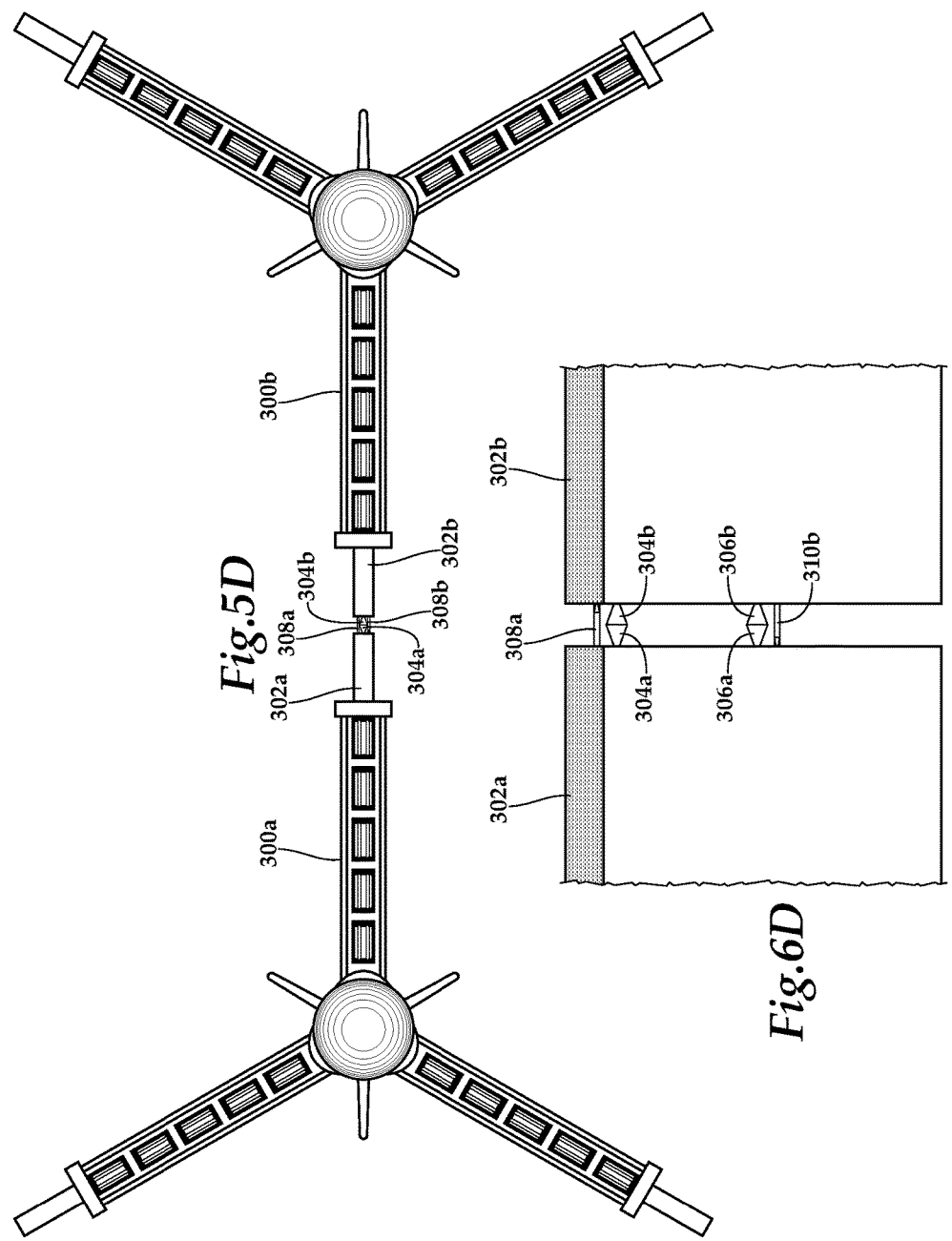

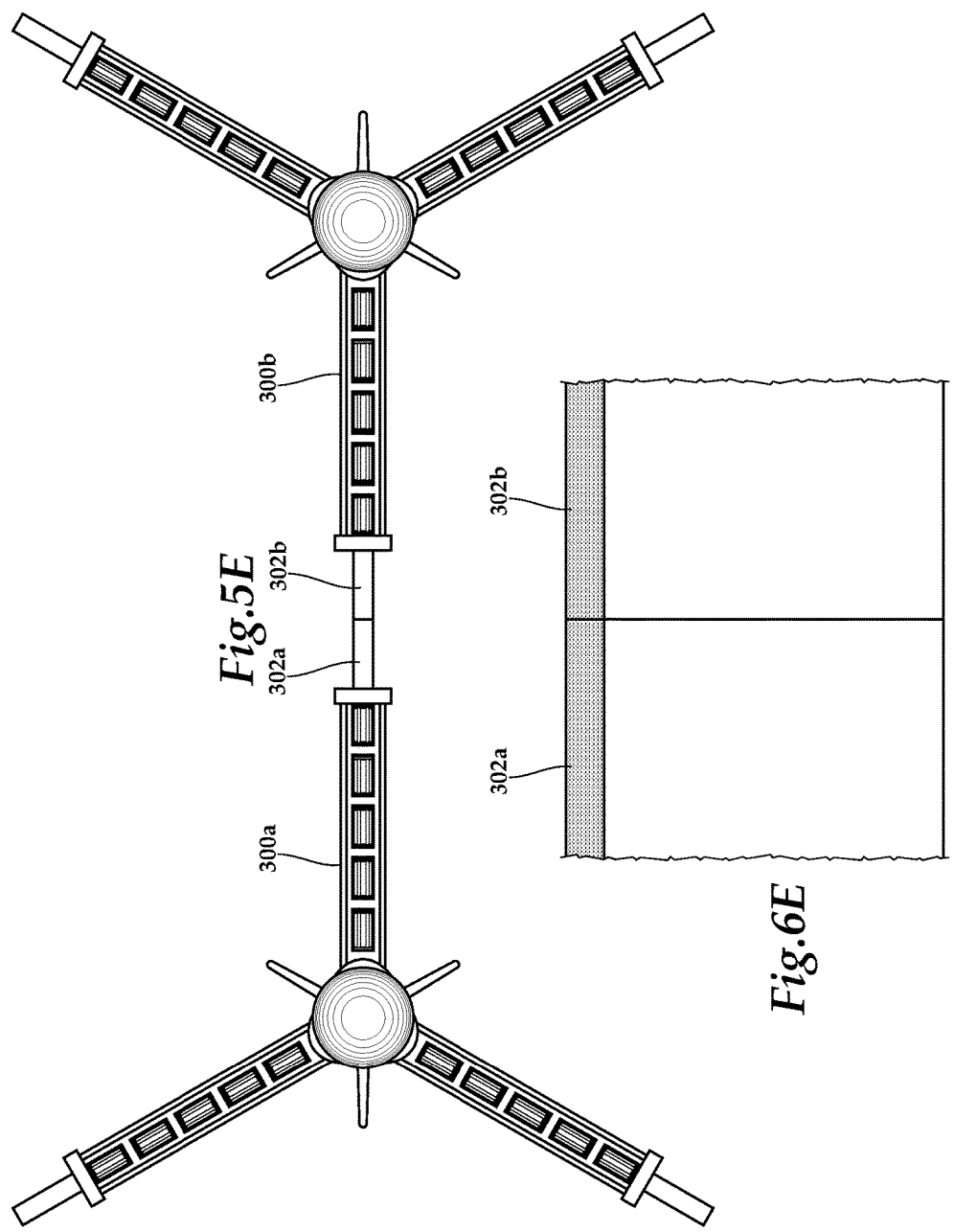

INFLIGHT CONNECTION OF AIRCRAFT

TECHNICAL FIELD OF THE DISCLOSURE

The present disclosure relates, in general, to forming inflight connections between aircraft and, in particular, to systems and methods of sequentially forming multiple connections between aircraft inflight and securably coupling the aircraft together wingtip-to-wingtip inflight.

BACKGROUND

Unmanned aircraft systems (UAS), also known as unmanned aerial vehicles (UAV) or drones, are self-powered aircraft that do not carry a human operator, uses aerodynamic forces to provide vehicle lift, are autonomously and/or remotely operated, may be expendable or recoverable and may carry lethal or nonlethal payloads. UAS are commonly used in military, commercial, scientific, recreational and other applications. For example, military applications include intelligence, surveillance, reconnaissance and attack missions. Civil applications include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few.

Certain UAS have been networked together such that they are capable of cooperating with one another and exhibiting swarm behavior. Such swarm UAS have the ability to dynamically adapt responsive to changing conditions or parameters including the ability for group coordination, distributed control, distributed tactical group planning, distributed tactical group goals, distributed strategic group goals and/or fully autonomous swarming. Recent industry goals for deploying and recovering swarm UAS include developing technologies and systems for enabling aircraft to safely and reliably perform aerial launch and aerial recovery of swarm UAS. It has been found, however, that due to the lightweight nature of many swarm UAS, approaching an aircraft for aerial recovery of swarm UAS remains a challenge.

SUMMARY

In a first aspect, the present disclosure is directed to an inflight connection system for aircraft each having at least one wing with a wingtip. For each aircraft, the system includes a primary connector selectively extendable from the wingtip, an alignment connector selectively extendable from the wingtip and a male and female connector assembly disposed proximate the wingtip. The primary connectors of each aircraft extend a greater distance from the wingtips than the alignment connectors such that the primary connectors form a first connection between the aircraft when the aircraft are flying in a connection pattern. After the first connection, retraction of the primary connectors reduces wingtip separation of the aircraft such that the alignment connectors form a second connection between the aircraft establishing coarse alignment therebetween. After the second connection, retraction of the primary and alignment connectors further reduces wingtip separation of the aircraft such that the male and female connector assemblies form a third connection between the aircraft establishing fine alignment therebetween.

In some embodiments, the primary and alignment connectors may include magnetic connectors such as electromagnetic connectors. The primary and alignment connectors may also include semi-rigid extension members such as extension members formed from fiberglass or carbon. In certain embodiments, linear actuators may be operable to extend and retract the primary and alignment connectors. In some embodiments, the primary and alignment connectors may include conical receptacles. In certain embodiments, after the third connection, retraction of the primary and alignment connectors securably couples the aircraft together wingtip-to-wingtip. Alternatively or additionally, locking member of the male and female connector assemblies and/or other systems may securably couple the aircraft together wingtip-to-wingtip.

In a second aspect, the present disclosure is directed to an inflight connection system for aircraft. The system includes first and second aircraft each having at least one wing with a wingtip. The first and second aircraft each include a primary connector selectively extendable from the wingtip, an alignment connector selectively extendable from the wingtip and a male and female connector assembly disposed proximate the wingtip. The primary connectors extend a greater distance from the wingtips than the alignment connectors such that the primary connectors form a first connection between the first and second aircraft when the first and second aircraft are flying in a connection pattern. After the first connection, retraction of the primary connectors reduces wingtip separation of the first and second aircraft such that the alignment connectors form a second connection between the first and second aircraft establishing coarse alignment therebetween. After the second connection, retraction of the primary and alignment connectors further reduces wingtip separation of the first and second aircraft such that the male and female connector assemblies form a third connection between the first and second aircraft establishing fine alignment therebetween.

In a third aspect, the present disclosure is directed to a method for inflight connection of aircraft having at least one wing with a wingtip. The method includes flying first and second aircraft in a connection pattern; extending a primary connector from the wingtips of the first and second aircraft; extending an alignment connector from the wingtips of the first and second aircraft; forming a first connection between the first and second aircraft with the primary connectors; retracting the primary connectors to reduce wingtip separation of the first and second aircraft; forming a second connection between the first and second aircraft with the alignment connectors, thereby establishing coarse alignment therebetween; retracting the primary and alignment connectors to further reduce wingtip separation of the first and second aircraft; and forming a third connection between the first and second aircraft with male and female connector assemblies of the first and second aircraft, thereby establishing fine alignment therebetween.

The method may also include magnetically forming the first connection, magnetically forming the second connection, retracting the primary and alignment connectors to securably couple the first and second aircraft together wingtip-to-wingtip and/or securably coupling the first and second aircraft together wingtip-to-wingtip with a locking member of each male and female connector assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 2A is a schematic illustration of a transport aircraft performing an aerial launch of a plurality of aircraft having inflight connection systems in accordance with embodiments of the present disclosure;

FIGS. 5A-5E are schematic illustrations of aircraft having inflight connection systems in a sequential connection scenario in accordance with embodiments of the present disclosure; and FIGS. 6A-6E are schematic illustrations of aircraft wingtips having inflight connection systems in a sequential connection scenario in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
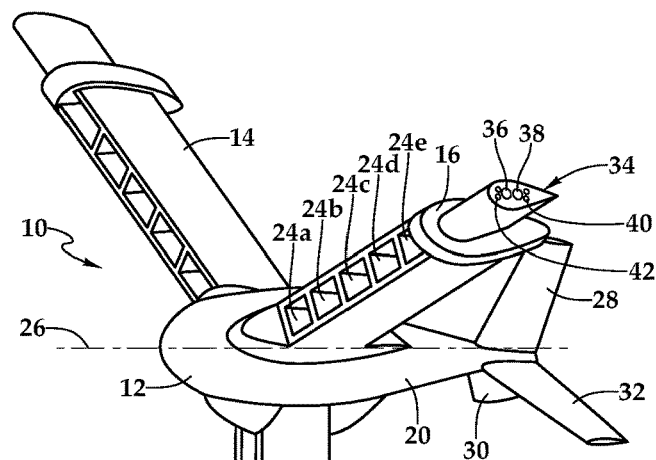
FIGS. 1A-1B are schematic illustrations of an aircraft having an inflight connection system in accordance with embodiments of the present disclosure.
Figure 1B:
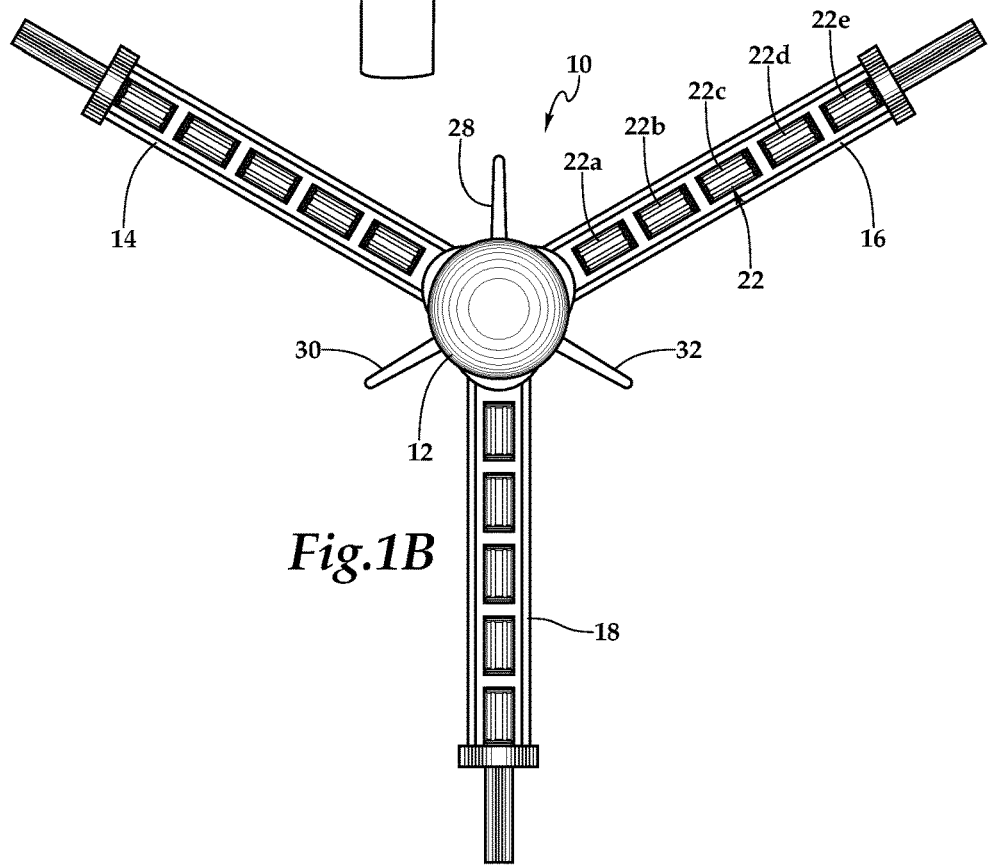

Referring to FIGS. 1A-1B in the drawings, an aircraft having an inflight connection system is schematically illustrated and generally designated 10. Aircraft 10 may be multirole UAS having a precision digital flight control and navigation system and the ability for swarm networking and cooperation. Aircraft 10 includes a fuselage 12, a plurality of wings 14, 16, 18 and a tailboom assembly 20. As illustrated, wings 14, 16, 18 each have an airfoil cross-section operable to generate lift responsive to the forward airspeed of aircraft 10 and form the main lifting surface of aircraft 10. Aircraft 10 has a propulsion system depicted as a distributed propulsion system 22 including a plurality of propulsion assemblies in the form of cross-flow fans located in chordwise channels of wings 14, 16, 18. For example, wings 16 includes cross-flow fans 22A-22E, as best seen in FIG. 1B, that are located in chordwise channels 24A-24E, as best seem in FIG. 1A.

Preferably, as discussed herein, the cross-flow fans have variable thrust capacities and may be operated independent of one another. Cross-flow fans of the present disclosure may preferably be operated responsive to one or more electrical motors but may alternatively be operated responsive to one or more hydraulic motors and/or liquid fuel powered engines. One or more cross-flow fans may be operated on a common drive shaft or each cross-flow fan may be operated by a unique drive system. Preferably, variable thrust control, as discussed herein, for each cross-flow fan is independent. Alternatively, more than one cross-flow fan could share a common variable thrust control actuator or system. As illustrated, air enters cross-flow fans 22A-22E from a forward intake portion of a respective chordwise channel 24A-24E and exits cross-flow fans 22A-22E into an aft discharge portion of a respective chordwise channel 24A-24E, thereby generating thrust generally parallel to a longitudinal fuselage axis 26. The aft portions of chordwise channels 24A-24E may include flaperons or other flow directing members to enable thrust vectoring.

Tailboom assembly 20 includes a plurality of control surfaces used during forward flight depicted as rudder 28 for yaw control and elevators 30, 32 for pitch control, in the illustrated configuration. It is noted that aircraft 10 may fly in other orientations wherein the control surfaces may serve alternate functions. For example, if wings 16, 18 are above fuselage 12 and wing 14 is below fuselage 12, then control surface 32 would operate as the rudder and control surfaces 28, 30 would operate as the elevators. In addition, even though aircraft 10 is depicted and described as having three wings that are circumferentially distributed uniformly about fuselage 12, it should be understood by those skilled in the art that an aircraft of the present disclosure could have other numbers of wings both greater than and less than three and/or have wings that are oriented in a nonuniform manner. In the present example, instead of wings 14, 16, 18 being oriented at 120-degree circumferential intervals (120/120/120), the wings could be oriented as 105/150/105, 90/180/90 or other desired wing orientation permutation. Also, even though control surface 28, 30, 32 are depicted as being circumferentially offset from wings 14, 16, 18 by 60 degrees, it should be understood by those skilled in the art that control surfaces for an aircraft of the present disclosure could have other orientations relative to the wings including being circumferentially inline with the wings. Further, even though the same number of wings and control surfaces has been depicted, it should be understood by those skilled in the art that the number of control surfaces and the number of wings are independent of each other.

Wings 14, 16, 18 each include a wingtip mounted an inflight connection system with inflight connection system 34 of wing 16 being visible in FIG. 1A. Inflight connection system 34 includes a plurality of connectors depicted as primary connector 36, alignment connector 38 and male and female connector assemblies 40, 42. As discussed herein, primary connector 36, alignment connector 38 and male and female connector assemblies 40, 42 cooperate with a matching set of connectors of another aircraft to sequentially form connections between the aircraft that enable reductions in wingtip separation, wingtip alignment and secure wingtip-to-wingtip coupling of the aircraft. For example, when two aircraft having inflight connection systems 34 are flying in a connection pattern, the primary connectors 36 and alignment connector 38 are extended from the respective wingtips of the aircraft. Preferably, primary connectors 36 extend a greater distance from the wingtips than alignment connectors 38 such that primary connectors 36 form a first connection between the aircraft. Thereafter, retraction of primary connectors 36 reduces wingtip separation of the aircraft such that alignment connectors 38 form a second connection between the aircraft, which also establishes coarse alignment therebetween. Thereafter, retraction of primary connectors 36 and alignment connectors 38 further reduces wingtip separation of the aircraft such that the male and female connector assemblies 40, 42 form a third connection between the aircraft, which also establishes fine alignment therebetween. Thereafter, retraction of primary connectors 36 and alignment connectors 38 securably couples the aircraft together wingtip-to-wingtip.

Figure 1C:
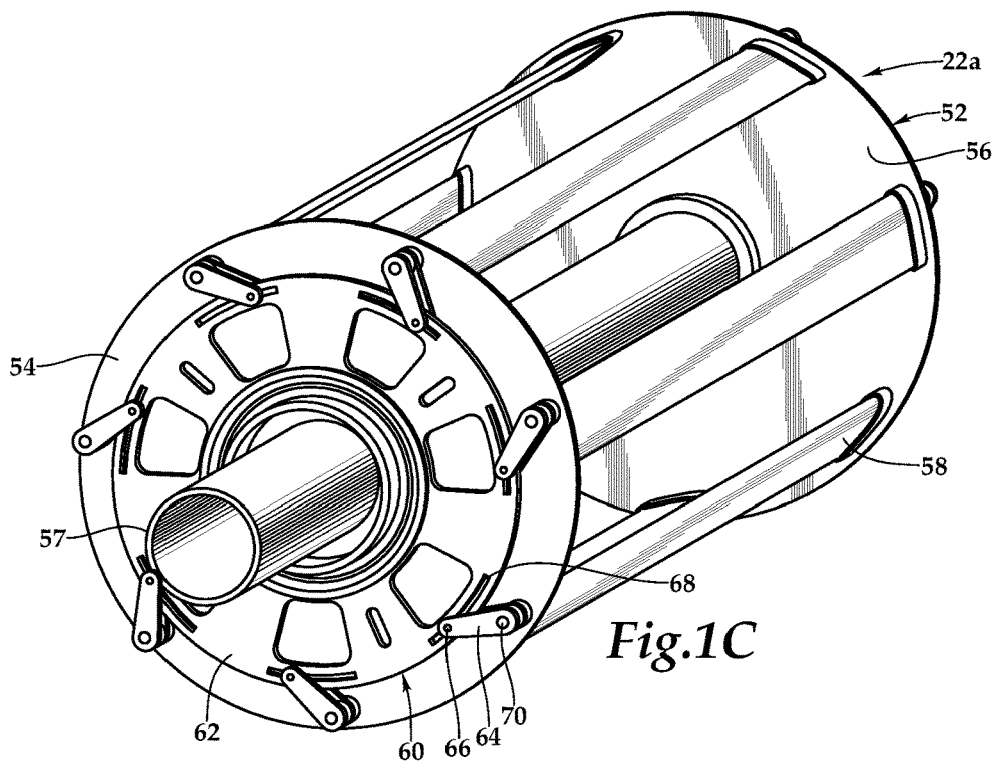
FIGS. 1C-1D are schematic illustrations of a variable thrust cross-flow fan system for an aircraft having an inflight connection system in accordance with embodiments of the present disclosure.

Referring to FIG. 1C, therein is depicted an embodiment of a variable thrust cross-flow fan, such as variable thrust cross-flow fan 22A of FIG. 1B. Variable thrust cross-flow fan 22A includes a cross-flow fan assembly 52 including driver plates 54, 56 which are coupled to and are rotatable about a longitudinal axis by a drive shaft 57. Cross-flow fan assembly 52 includes a plurality of blades 58 that are each rotatably coupled between driver plates 54, 56. As illustrated, blades 58 are disposed radially outwardly from the longitudinal axis such that blades 58 follow a generally circular path of travel when cross-flow fan assembly 52 rotates about the longitudinal axis. Variable thrust cross-flow fan 22A includes a control assembly 60 that is coupled to each of blades 58. In the illustrated embodiment, control assembly 60 includes a control cam 62 that is rotatable with and translatable relative to cross-flow fan assembly 52. Control assembly 60 also includes a plurality of linkages 64 that are slidably coupled to control cam 62 via follower pins 66 in follower slots 68 of driver plate 54 and fixably coupled to blades 58 via driver pins 70 that extend through linkage holes (not visible) of driver plate 54.

When cross-flow fan assembly 52 is rotated by drive shaft 57 and control cam 62 is positioned concentrically with cross-flow fan assembly 52, follower pins 66 do not move relative to follower slots 68 and blades 58 do not rotate relative to driver plates 54, 56. In this state, blades 58 are in a neutral configuration wherein each of the blades 58 has a substantially zero pitch during an entire revolution of cross-flow fan assembly 52, as illustrated in FIG. 1C. In this neutral configuration, all of blades 58 have a substantially zero angle of attack and therefore produce little or no thrust. To produce thrust, blades 58 are rotated relative to driver plates 54, 56 in response to shifting control cam 62 forward, in the chordwise direction of wing 16, relative to cross-flow fan assembly 52. When control cam 62 is position eccentrically relative to cross-flow fan assembly 52 and cross-flow fan assembly 52 is rotated by drive shaft 57, follower pins 66 cyclically slide within follower slots 68 which cyclically pivots linkages 64 and cyclically rotates blades 58 relative to driver plates 54, 56.

Figure 1D:
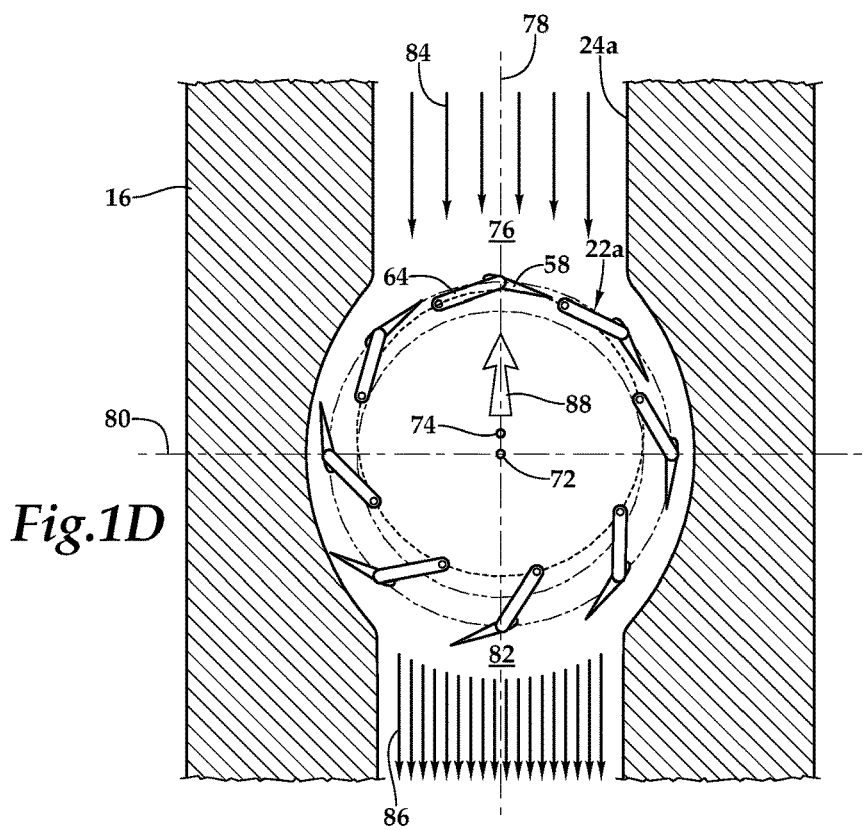

Referring additionally to FIG. 1D, variable thrust cross-flow fan 22A is disposed within chordwise channel 24A of wing 16. In the illustrated configuration, the center of rotation of control cam 62 has been shifted forward from a concentric location 72 to an eccentric location 74. In this configuration, as each blade 58 follows the generally circular path of travel, the blades transition between positive pitch, zero pitch, negative pitch, zero pitch and back to positive pitch during each revolution of cross-flow fan assembly 52. As illustrated, blades 58 have an airfoil cross section and travel in a counterclockwise direction. As blades 58 approach forward intake 76 of chordwise channel 24A, the blades have progressively greater positive pitch reaching a maximum positive pitch proximate axis 78. Thereafter, as blades 58 retreat from forward intake 76, the blades have progressively lesser positive pitch reaching zero pitch proximate axis 80. As blades 58 approach aft discharge 82 of chordwise channel 24A, the blades have progressively greater negative pitch reaching a maximum negative pitch proximate axis 78. Thereafter, as blades 58 retreat from aft discharge 82, the blades have progressively lesser negative pitch, reaching zero pitch proximate axis 80. Each blade 58 repeats this cycle on each revolution of cross-flow fan assembly 52.

As blades 58 follow the generally circular path of travel with the cyclically varying angle of attack described herein, air passes through cross-flow fan assembly 52 as indicated by low-density intake airflow arrows 84 and high-density discharge airflow arrow 86 with the resultant thrust indicated by arrow 88. The magnitude of thrust 88 generated by variable thrust cross-flow fan system 22A is determined by factors including the magnitude of the eccentricity applied to control cam 62, the rotational speed of cross-flow fan assembly 52, the cross sectional shape of blades 58, the pitch cycle of blades 58, the number of blades 58 and other factors known to those having skill in the art. Even though a particular type of propulsion system has been depicted and described, it should be understood by those skilled in the art that aircraft having inflight connection systems of the present disclosure could have other types of propulsion systems including one or more rotors, propellers, turboprops, proprotors or other thrust generating systems.

Referring next to FIG. 2A, therein is depicted a transport aircraft or airlifter performing an aerial launch of a plurality of aircraft having inflight connection systems that is schematically illustrated and generally designated 100. Airlifter 100 includes a fuselage 102 having an elongated cargo bay suitable for carrying a large number of aircraft having inflight connection systems. As illustrated, an aft cargo door 104 of airlifter 100 has been opened and a swarm of aircraft having inflight connection systems, denoted as aircraft 106A-106L, has been aerially launched from airlifter 100. It is noted that aircraft 106A-106L may be multirole UAS with various aircraft 106A-106L performing different functions. For example, certain of aircraft 106A-106L could be reconnaissance aircraft, other of aircraft 106A-106L could be attack aircraft and still other of aircraft 106A-106L could be refueling aircraft. In this example, aircraft 106A-106L, using networked communications, could cooperate together such that refueling aircraft could periodically connect with and separate from reconnaissance aircraft and/or attack aircraft to recharge batteries during flight and extend mission endurance. In addition, it has been found, that connecting aircraft 106A-106L together can improve overall aerodynamics and reduce drag, thereby also increasing mission endurance.

Figure 2B:
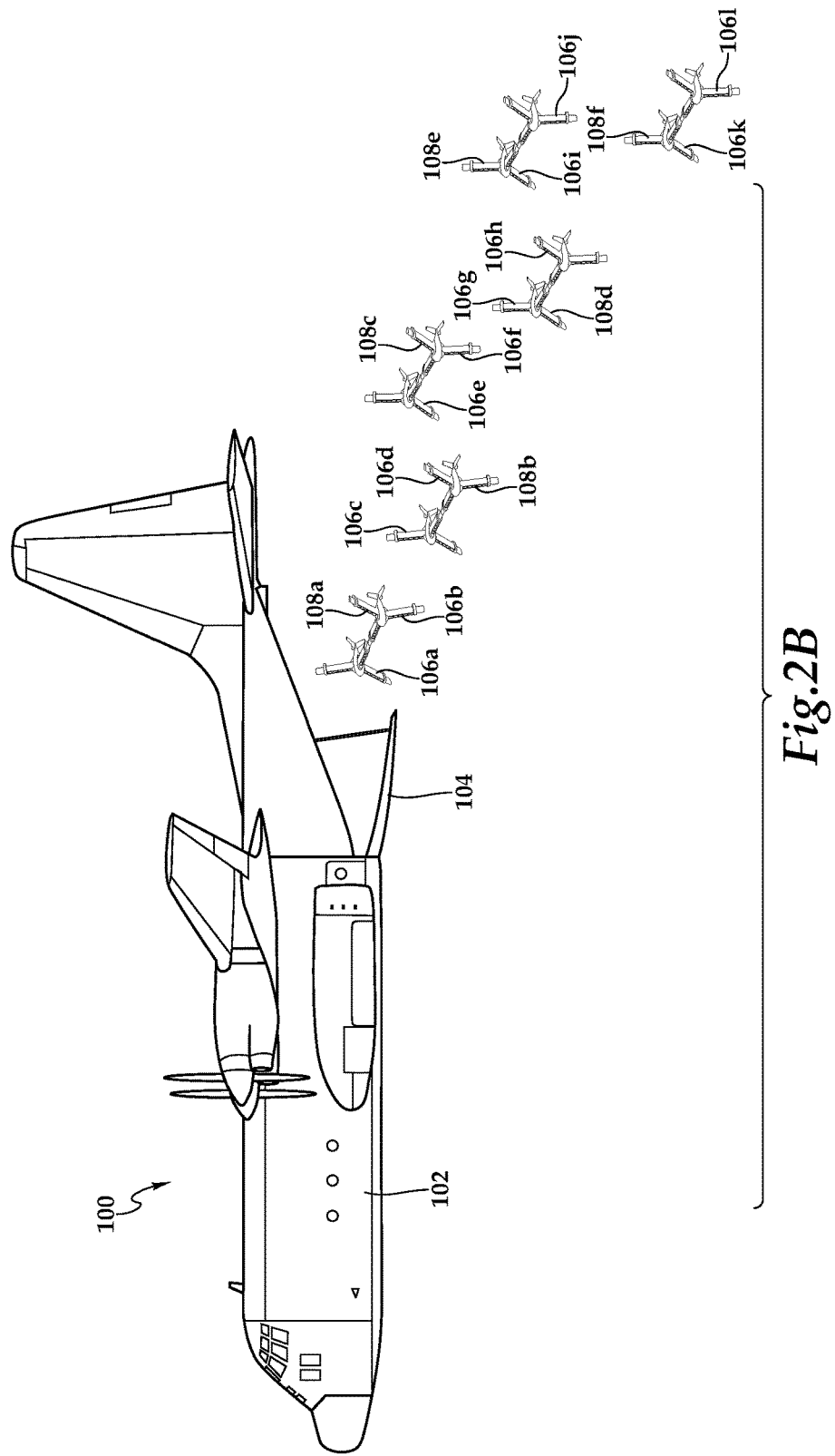
FIG. 2B is a schematic illustration of a transport aircraft performing an aerial recovery of a plurality of aircraft having inflight connection systems in accordance with embodiments of the present disclosure.

Another benefit of being able to connect aircraft 106A-106L together is improved aerial recovery by airlifter 100, as best seen in FIG. 2B. One problem encountered during attempted aerial recovery of swarm UAS is the difficulty of the relatively low mass aircraft to maintain flight control in the unstable air trailing airlifter 100. As discussed herein, aircraft 106A-106L are operable to connect to one another to form pairs, hexagonals or other geometrically advantageous configurations. For example, aircraft 106A-106L have formed pairs 108A-108F in the illustrated embodiment, which improves the ability of airlifter 100 to perform an aerial recovery of aircraft 106A-106L due to increased mass and increased thrust capabilities.

Figure 3A:
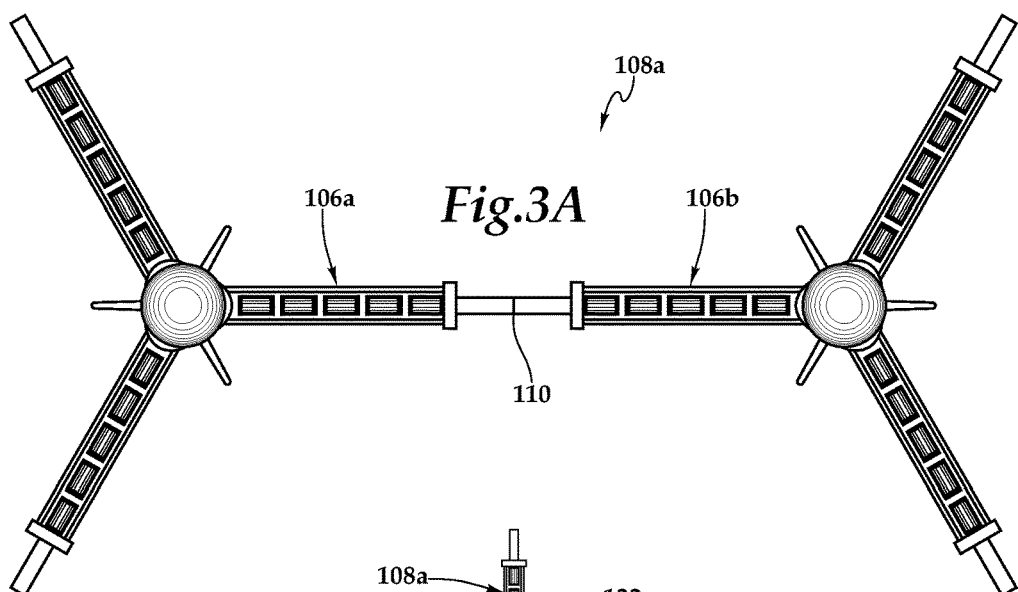
FIGS. 3A-3B are schematic illustrations of aircraft having inflight connection systems that are connected wingtip-to-wingtip in accordance with embodiments of the present disclosure.
Figure 3B:
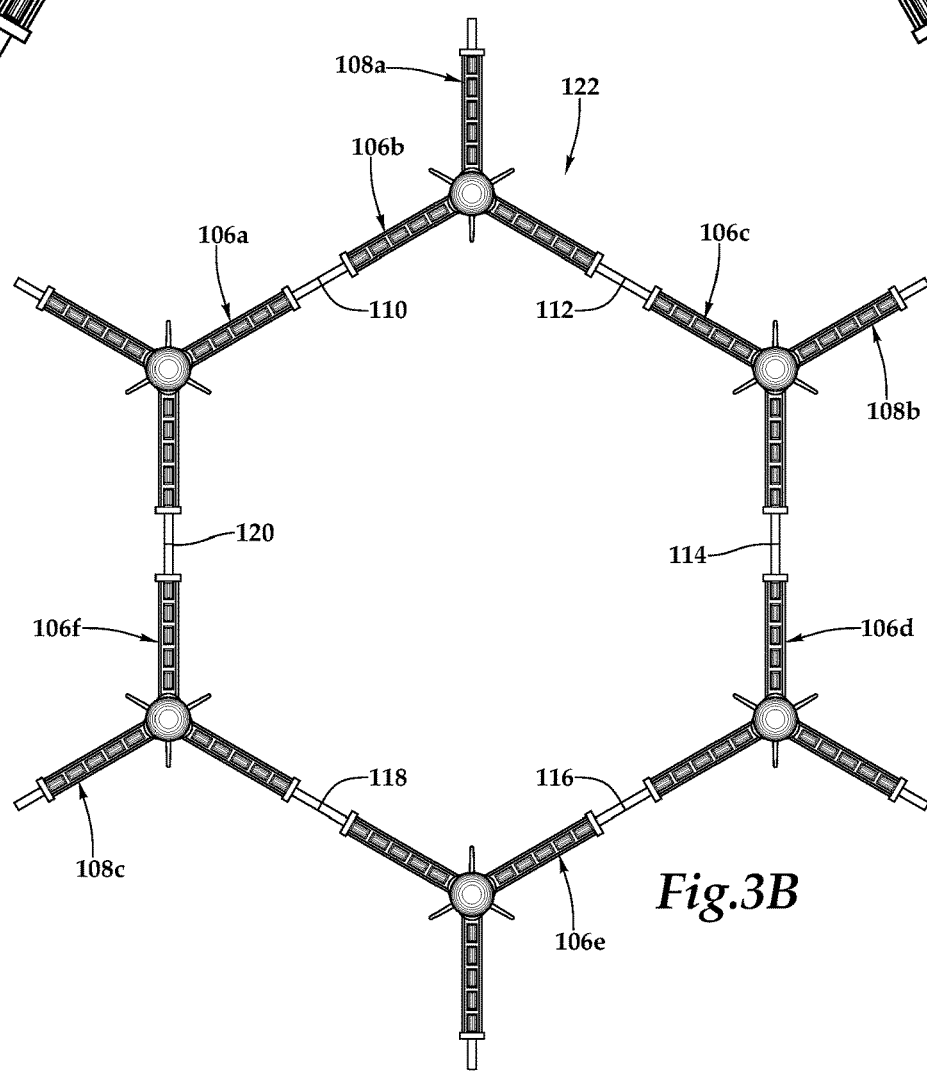

Referring next to FIGS. 3A-3B in the drawings, aircraft having inflight connection systems are depicted in connected configurations. In FIG. 3A, aircraft 106A and aircraft 106B are coupled together wingtip-to-wingtip at connection 110 to form pair 108A. Similarly, in FIG. 3B, aircraft 106A and aircraft 106B are coupled together wingtip-to-wingtip at connection 110 forming pair 108A, aircraft 106B and aircraft 106C are coupled together wingtip-to-wingtip at connection 112, aircraft 106C and aircraft 106D are coupled together wingtip-to-wingtip at connection 114 forming pair 108B, aircraft 106D and aircraft 106E are coupled together wingtip-to-wingtip at connection 116, aircraft 106E and aircraft 106F are coupled together wingtip-to-wingtip at connection 118 forming pair 108C and aircraft 106F and aircraft 106A are coupled together wingtip-to-wingtip at connection 120. Together, aircraft 106A-106F form hexagonal 122. By forming pair 108A, an improvement in overall aerodynamics and reduced drag can be achieved compared to flying aircraft 106A, 106B as individual aircraft. Likewise, by forming hexagonal 122, an improvement in overall aerodynamics and reduced drag can be achieved compared to flying aircraft 106A-106F as individual aircraft. The improved aerodynamics and reduced drag achieved by pair 108A and hexagonal 122 can yield increased mission endurance, thus enabling 106A-106F to go farther, stay out longer and cover more area. Even through particular connected aircraft configurations have be depicted and described, other connected aircraft configurations are also possible and may be desirable for certain implementations. For example, for aircraft having the depicted three wing (120/120/120) design, multi-hexagonal or honeycomb configurations may be formed. For aircraft having alternate wing configurations, the geometric organization of connected aircraft will be determined based upon the particular wing configuration of the particular aircraft.

Figure 4:
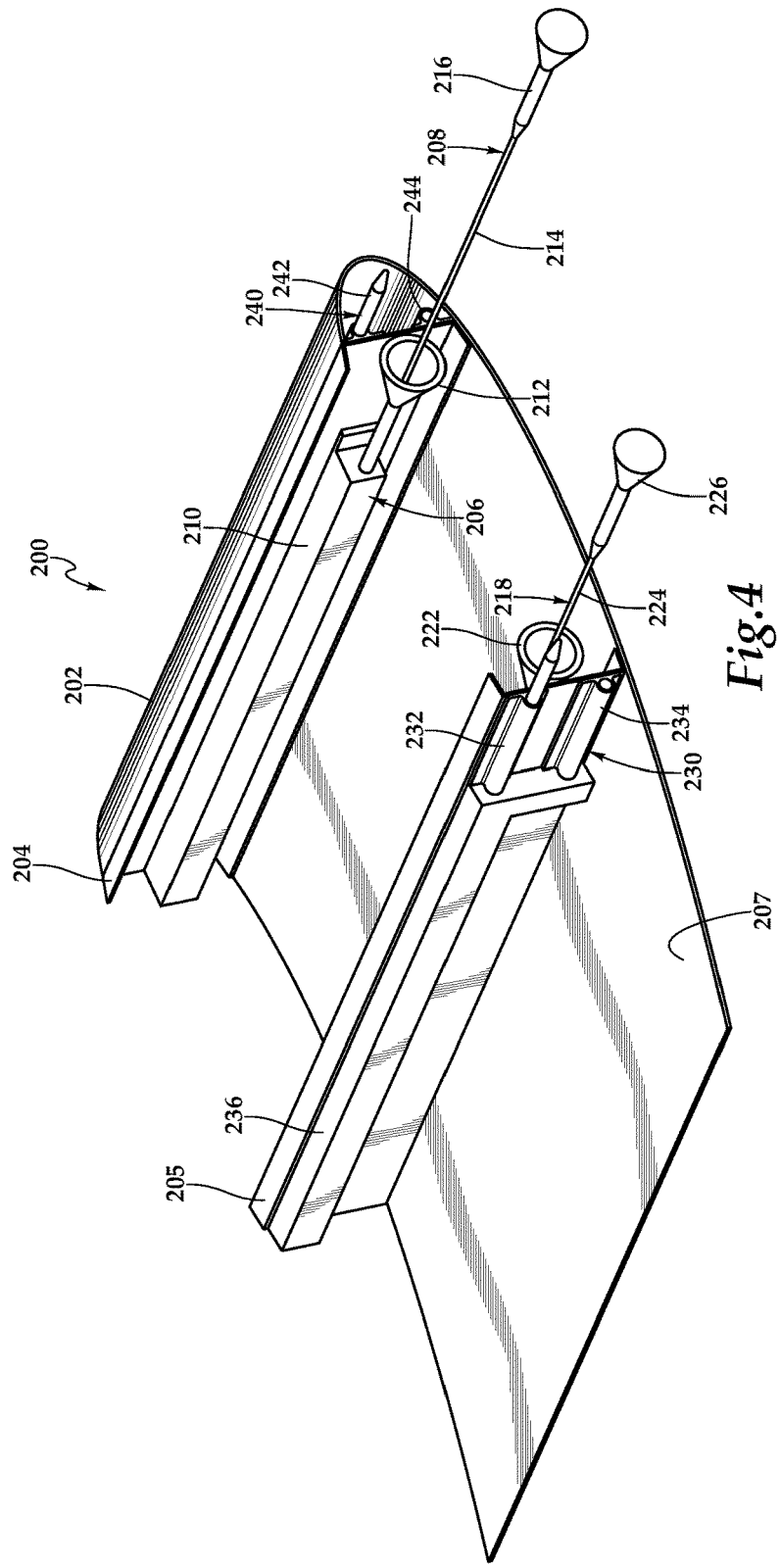
FIG. 4 is an isometric view of an inflight connection system positioned at a wingtip of an aircraft in accordance with embodiments of the present disclosure.

Referring next to FIG. 4 in the drawings, a wingtip section of an aircraft having an inflight connection system is depicted and generally designated 200. Wingtip 200 includes a leading edge 202, a forward spar 204, an aft spar 205 and a lower skin 207. In the illustrated embodiment, the upper skin of wingtip 200 has been removed for purposes of revealing components of inflight connection system 206 disposed within wingtip 200. As illustrated, inflight connection system 206 has a primary connector 208 supported by spar 204. Primary connector 208 includes an actuator 210, a receptacle 212, an extension member 214 and a connector 216. Preferably, actuator 210 is an electrically operated linear or rotary actuator operable to extend and retract extension member 214 outwardly and inwardly relative to wingtip 200. Actuator 210 preferably receives commands from and provides sensor data to the digital flight control system of the aircraft. Receptacle 212 extends from actuator 210 and has an inner conical shape designed to provide alignment functionality with connector 216 during aircraft connection operations.

Extension member 214 is preferably a semi-rigid extension member formed from a high tensile strength but flexible material such as fiberglass or carbon but may be formed from other materials including metals. Extension member 214 extends from and retracts into receptacle 212 and actuator 210 during operations. Extension member 214 preferably includes one or more electrical and/or communications wires disposed therein to carry electricity and/or information. Disposed on the distal end of extension member 214 is connector 216 such as a magnetic connector. In some embodiments, connector 216 may be a permanent magnet but preferably, connector 216 is an electromagnetic that is coupled to the electrical system and control system of the aircraft via the wires within extension member 214 and is operable to be either a north pole or a south pole depending upon the direction of current flow. Connector 216 has an outer conical shaped designed to mate with the inner conical shape of receptacle 212 during retraction operations.

Similarly, inflight connection system 206 has an alignment connector 218 supported by spar 205. Alignment connector 218 includes an actuator (not visible), a receptacle 222, an extension member 224 and a connector 226. The actuator is preferably an electrically operated linear or rotary actuator operable to extend and retract extension member 224 outwardly and inwardly relative to wingtip 200. The actuator preferably receives commands from and provides sensor data to the digital flight control system of the aircraft. Receptacle 222 extends from the actuator and has an inner conical shape designed to provide alignment functionality with connector 226 during aircraft connection operations. Extension member 224 is preferably a semi-rigid extension members that extends from and retracts into receptacle 222 and the actuator during operations and preferably includes one or more electrical and/or communications wires disposed therein. Disposed on the distal end of extension member 224 is connector 226 such as a magnetic connector including a permanent magnet or preferably an electromagnetic that is coupled to the electrical system and control system of the aircraft via the wires within extension member 224 and is operable to be either a north pole or a south pole depending upon the direction of current flow. Connector 226 has an outer conical shaped designed to mate with the inner conical shape of receptacle 222 during retraction operations.

In the illustrated embodiment, inflight connection system 206 includes a connector assembly 230 supported by spar 205. Connector assembly 230 includes a male plunger 232 and a female receptacle 234. Connector assembly 230 may be a passive assembly or may be an active assembly, as illustrated, connected to the electrical system and control system of the aircraft via wires within conduit 236. In this embodiment, male plunger 232 may be retractable and/or rotatable. In the case of a rotatable system, male plunger 232 may preferable include external threads or similar features operable to mate with internal threads or other matching features of a female receptacle on the connecting aircraft to securably couple the aircraft together in a wingtip-to-wingtip configuration. Alternatively or additionally, male plunger 232 and/or female receptacle 234 may be used to transfer power between aircraft once two aircraft are securably coupled together in the wingtip-to-wingtip configuration. For example, a refueling aircraft could charge the batteries of a reconnaissance aircraft and/or an attack aircraft by connecting therewith during flight via a male and female connector assembly, such as connector assembly 230.

In the illustrated embodiment, inflight connection system 206 includes a connector assembly 240 supported by spar 204. Connector assembly 240 includes a male plunger 242 and a female receptacle 244. Connector assembly 240 may be a passive assembly or an active assembly, wherein male plunger 242 may be retractable and/or rotatable, in which case, male plunger 242 may preferable include external threads or similar features operable to mate with internal threads or other matching features of a female receptacle on the connecting aircraft to securably couple the aircraft together in a wingtip-to-wingtip configuration. Connector assembly 240 may also be used to transfer power between aircraft once two aircraft are securably coupled together in the wingtip-to-wingtip configuration.

Referring next to FIGS. 5A-5E and 6A-6E in the drawings, a sequential inflight connection scenario of aircraft with inflight connection systems is depicted. Aircraft 300A, 300B, such as multirole UAS having precision digital flight control and navigation systems with the ability for swarm networking and cooperation, are shown flying in a connection pattern, wherein wingtip 302A of aircraft 300A and wingtip 302B of aircraft 300B are in a generally horizontal attitude and generally aligned forward and aft as well as up and down. As best seen in FIGS. 5A and 6A, each aircraft 300A, 300B has deployed its inflight connection system. As illustrated, aircraft 300A has extended primary connector 304A and alignment connector 306A outwardly from wingtip 302A. Likewise, aircraft 300B has extended primary connector 304B and alignment connector 306B outwardly from wingtip 302B. It is noted that the inflight connection systems and the orientation of the components of the inflight connection systems of each aircraft 300A, 300B are substantially identical which enables general alignment of the components when aircraft 300A, 300B are flying in the illustrated connection pattern. As primary connectors 304A, 304B and alignment connectors 306A, 306B include semi-rigid extension members, primary connectors 304A, 304B and alignment connectors 306A, 306B remain generally parallel with one another during flight in the connection pattern.

As best seen in FIGS. 5B and 6B, the magnetic attraction between primary connectors 304A, 304B forms a first connection between aircraft 300A, 300B. For example, aircraft 300A may activate the electromagnet of primary connector 304A as a north pole while aircraft 300B may activate the electromagnet of primary connector 304B as a south pole. The opposite poles create a strong magnetic attraction therebetween, which pulls primary connectors 304A, 304B together. After the first connection is achieved, retraction of primary connectors 304A, 304B reduces wingtip separation of aircraft 300A, 300B. At this point or previously, aircraft 300A may activate the electromagnet of alignment connector 306A as one pole while aircraft 300B may activate the electromagnet of alignment connector 306B as the opposite pole such that alignment connectors 306A, 306B attract one another to form a second connection between aircraft 300A, 300B, as best seen in FIGS. 5C and 6C. This second connection establishes a coarse alignment between aircraft 300A, 300B supporting alignment in three degrees of freedom; namely, forward and aft alignment, up and down alignment and rotational alignment.

Following the second connection, retraction of primary connectors 304A, 304B and alignment connectors 306A, 306B further reduces wingtip separation of aircraft 300A, 300B. Further retraction causes the conically shaped connectors to mate with the inner conically shaped receptacles (see FIG. 4) of primary connectors 304A, 304B and alignment connectors 306A, 306B. Further retraction causes male and female connection assemblies 308A, 308B and male and female connection assemblies 310A, 310B to form a third connection between aircraft 300A, 300B, as best seen in FIGS. 5D and 6D. This third connection establishes a fine alignment between aircraft 300A, 300B with respect to all degrees of freedom. Following the third connection, retraction of primary connectors 304A, 304B and alignment connectors 306A, 306B further reduces wingtip separation, as best seen in FIGS. 5E and 6E. Aircraft 300A, 300B are now securably coupled together wingtip-to-wingtip.

The secure connection between aircraft 300A, 300B can be maintained by continued powering of the electromagnets of primary connectors 304A, 304B and alignment connectors 306A, 306B. Alternatively or additionally, the secure connection between aircraft 300A, 300B can be maintained by a locking relationship established between male and female connection assemblies 308A, 308B, 310A, 310B, such as the threaded relationship described herein. Male and female connection assemblies 308A, 308B, 310A, 310B may alternatively include other types of mechanical locking engagements including snap rings, spring-loaded detents or other locking features. Alternatively or additionally, the inflight connection system may include an independent locking system used to secure aircraft 300A, 300B together once primary connectors 304A, 304B and alignment connectors 306A, 306B have been fully retracted.

If it is desired to release from the wingtip-to-wingtip connection configuration and return to independent flight, aircraft 300A, 300B disengage the various connections enabling aircraft 300A, 300B to fly in a separation pattern. For example, aircraft 300A, 300B will disengage any independent locking systems and/or any locking relationship established between male and female connection assemblies 308A, 308B, 310A, 310B. If not previously disengaged, aircraft 300A, 300B will disengage the magnetic connections between primary connectors 304A, 304B and alignment connectors 306A, 306B, with or without extending primary connectors 304A, 304B and/or alignment connectors 306A, 306B. Once each securing mechanism has been disengaged, independent flight of aircraft 300A, 300B is enabled.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An inflight connection system for first and second aircraft each having at least one wing with a wingtip, for each aircraft, the system comprising:

a primary connector including a primary conical receptacle and a primary conical connector, the primary conical connector selectively extendable from the primary conical receptacle relative to the wingtip;

an alignment connector including an alignment conical receptacle and an alignment conical connector, the alignment conical connector selectively extendable from the alignment conical receptacle relative to the wingtip; and at least one male and female connector assembly disposed proximate the wingtip, wherein, the primary conical connectors extend a greater distance from the wingtips than the alignment conical connectors such that the primary conical connectors form a first connection between the first and second aircraft when the first and second aircraft are flying in a connection pattern;

wherein, after the first connection, retraction of the primary conical connectors reduces wingtip separation of the first and second aircraft such that the alignment conical connectors form a second connection between the first and second aircraft establishing coarse alignment therebetween; and wherein, after the second connection, retraction of the primary and alignment conical connectors into the respective primary and alignment conical receptacles further reduces wingtip separation of the first and second aircraft such that the at least one male and female connector assemblies form a third connection between the first and second aircraft establishing fine alignment therebetween.

2. The system as recited in claim 1 wherein the primary and alignment conical connectors further comprise magnetic connectors.

3. The system as recited in claim 1 wherein the primary and alignment conical connectors further comprise electromagnetic connectors.

4. The system as recited in claim 1 wherein the primary and alignment connectors further comprise semi-rigid extension members respectively coupled to the primary and alignment conical connectors.

5. The system as recited in claim 4 wherein the semi-rigid extension members are formed from a material selected from the group consisting of fiberglass and carbon.

6. The system as recited in claim 4 wherein the primary and alignment connectors are operably coupled to linear actuators operable to extend and retract the primary and alignment conical connectors via the semi-rigid extension members.

7. The system as recited in claim 1 wherein at least a portion of the at least one male and female connector assembly of each aircraft is rotatable to threadably couple the first and second aircraft together wingtip-to-wingtip.

8. The system as recited in claim 1 wherein, after the third connection, retraction of the primary and alignment conical connectors securably couples the first and second aircraft together wingtip-to-wingtip.

9. The system as recited in claim 1 wherein the at least one male and female connector assembly of each aircraft further comprises a locking member that securably couples the first and second aircraft together wingtip-to-wingtip.

10. The system as recited in claim 1 wherein each aircraft further comprises at least two male and female connector assemblies.

11. An inflight connection system for aircraft, the system comprising:

first and second aircraft each having at least one wing with a wingtip, the first and second aircraft each including:

a primary connector including a primary conical receptacle and a primary conical connector, the primary conical connector selectively extendable from the primary conical receptacle relative to the wingtip;

an alignment connector including an alignment conical receptacle and an alignment conical connector, the alignment conical connector selectively extendable from the alignment conical receptacle relative to the wingtip; and at least one male and female connector assembly disposed proximate the wingtip, wherein, the primary conical connectors extend a greater distance from the wingtips than the alignment conical connectors such that the primary conical connectors form a first connection between the first and second aircraft when the first and second aircraft are flying in a connection pattern;

wherein, retraction of the primary conical connectors reduces wingtip separation of the first and second aircraft such that the alignment conical connectors form a second connection between the first and second aircraft establishing coarse alignment therebetween; and wherein, retraction of the primary and alignment conical connectors into the respective primary and alignment conical receptacles further reduces wingtip separation of the first and second aircraft such that the at least one male and female connector assemblies form a third connection between the first and second aircraft establishing fine alignment therebetween.

12. The system as recited in claim 11 wherein the primary and alignment conical connectors further comprise magnetic connectors.

13. The system as recited in claim 11 wherein the primary and alignment connectors further comprise semi-rigid extension members respectively coupled to the primary and alignment conical connectors.

14. The system as recited in claim 11 wherein, after the third connection, retraction of the primary and alignment conical connectors securably couples the first and second aircraft together wingtip-to-wingtip.

15. The system as recited in claim 11 wherein the at least one male and female connector assembly of each aircraft further comprises a locking member that securably couples the first and second aircraft together wingtip-to-wingtip.

16. A method for inflight connection of aircraft having at least one wing with a wingtip, the method comprising:

flying first and second aircraft in a connection pattern;

extending a primary conical connector from a primary conical receptacle relative to the wingtips of the first and second aircraft;

extending an alignment conical connector from an alignment conical receptacle relative to the wingtips of the first and second aircraft;

forming a first connection between the first and second aircraft with the primary conical connectors of the first and second aircraft;

retracting the primary conical connectors to reduce wingtip separation of the first and second aircraft;

forming a second connection between the first and second aircraft with the alignment conical connectors of the first and second aircraft to establish coarse alignment therebetween;

retracting the primary and alignment conical connectors into the respective primary and alignment conical receptacles to further reduce wingtip separation of the first and second aircraft; and forming a third connection between the first and second aircraft with male and female connector assemblies of the first and second aircraft to establish fine alignment therebetween.

17. A method as recited in claim 16 wherein forming the first connection between the first and second aircraft with the primary conical connectors of the first and second aircraft further comprises magnetically forming the first connection.

18. A method as recited in claim 16 wherein forming the second connection between the first and second aircraft with the alignment conical connectors of the first and second aircraft further comprises magnetically forming the second connection.

19. A method as recited in claim 16 further comprising, after forming the third connection, retracting the primary and alignment conical connectors to securably couple the first and second aircraft together wingtip-to-wingtip.

20. The method as recited in claim 16 further comprising securably coupling the first and second aircraft together wingtip-to-wingtip with a locking member of each male and female connector assembly.

* * * * *